(12) United States Patent
Kiss et al.

(10) Patent No.: US 8,747,659 B2
(45) Date of Patent: Jun. 10, 2014

(54) HYDROTREATING PROCESS

(75) Inventors: Gabor Kiss, Hampton, NJ (US); Lulian Nistor, Center Valley, PA (US); John Zengel, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 479 days.

(21) Appl. No.: 12/660,249

(22) Filed: Feb. 23, 2010

(65) Prior Publication Data

US 2011/0203971 A1 Aug. 25, 2011

(51) Int. Cl.
*C10G 45/00* (2006.01)
*B01J 23/16* (2006.01)
*B01J 23/92* (2006.01)
*C10G 45/08* (2006.01)
*C10G 45/06* (2006.01)

(52) U.S. Cl.
USPC ...... 208/216 R; 208/208 R; 208/46; 208/217; 208/177; 502/305; 502/313

(58) Field of Classification Search
CPC ....................................... C10G 49/24
USPC ....... 208/208 R, 244, 111.3, 111.35, 46, 177, 208/209, 213, 216 R, 217, 254 R, 254 H; 502/20, 22, 28, 29, 30, 100, 300, 305, 502/313
See application file for complete search history.

(56) References Cited

U.S. PATENT DOCUMENTS

| 3,308,054 | A | | 3/1967 | Duir et al. |
| 3,368,965 | A | | 2/1968 | Schuman |
| 3,423,307 | A | | 1/1969 | McKinney et al. |
| 3,436,338 | A | | 4/1969 | Groves et al. |
| 3,654,138 | A | * | 4/1972 | Mosby ........................ 208/111.3 |
| 4,098,721 | A | | 7/1978 | Ganster et al. |
| 4,149,965 | A | | 4/1979 | Pine et al. |
| 5,034,116 | A | * | 7/1991 | Newman ........................ 208/131 |
| 5,306,681 | A | | 4/1994 | Schorfheide et al. |

FOREIGN PATENT DOCUMENTS

| EP | 0189635 A1 | 8/1986 |
| WO | 9838265 A1 | 9/1998 |

OTHER PUBLICATIONS

Parkash, S, Refining Processes Handbook, 2003, Gulf Publishing, pp. 16 & 31.*
Guidelines for actiCAT Presulfurized Catalyst, Apr. 2005, Criterion Catalyst & Technologies, p. 1-11.*
Song, Tao; Zhang, Zisheng; Chen, Jinwen; Ring, Zbigniew; Yang, Hong; Zheng, Ying, "Effect of Aromatics on Deep Hydrodesulfurization of Dibenzothiophene and 4,6-Dimethyldibenzothiophene over NiMo/Al2O3 Catalyst", Energy & Fuels, Nov./Dec. 2006, 20(6), pp. 2344-2349.

(Continued)

*Primary Examiner* — Walter D Griffin
*Assistant Examiner* — Derek Mueller
(74) *Attorney, Agent, or Firm* — Glenn T. Barrett; Bruce M. Bordelon; David M. Weisberg

(57) ABSTRACT

A process for hydrotreating a first aromatics- and sulfur-containing hydrocarbon feed using a fresh supported CoMo catalyst, includes treating the fresh catalyst under first hydrotreating conditions with a second hydrocarbon feed having a lower aromatics content than the first feed.

6 Claims, 1 Drawing Sheet

(56) References Cited

OTHER PUBLICATIONS

Zainullin, KH N; Tanatarov, MA, "Deactivation of an Alumina-Cobalt-Molybdenum Catalyst by Condensation Products", Neftekhimiya vol. 20 N.3, pp. 382-387 (May-Jun. 1980).

Galiasso R.; Badras, C.; Garcia, W.; Ramirez De Agudelo, R.; Rodriguez, E., "Hydrotreatment of Cracked Gas Oils (CGO) Hydrotraitement De Gasoles Craques", Rev. Inst. Fr. Pet. vol. 42 N.5, pp. 567-585 (Sep.-Oct. 1987), ISSN: 0020-2274.

Turaga, Uday T.; Song, Chunshan, "MCM-41 Supported Co-Mo Catalysts for Deep Hydrodesulfurization of Light Cycle Oil-Based Real Feedstock", Fuel Chemistry Division Preprints 2002, 47(2), pp. 457-459.

Leliveld, R.G.; Van Dillen, A.J.; Geus, J.W.; Konongsberger, D.C., "Structure and Nature of the Active Sites in CoMo Hydrotreating Catalysts Conversion of Thiophene", Journal of Catalysis 175, pp. 108-116 (1998).

Rana, Mohan S.; Ramirez, Jorge; Gutierrez-Alejandre, Aida; Ancheyta, Jorge; Cedeno, Luis; Maity, S.K., "Support effects in CoMo hydrodesulfurization catalysts prepared with EDTA as a chelating agent", Journal of Catalysis 246 (2007), pp. 100-108.

Topsoe, Henrik; Clausen Bjerne S.; "Active Sites and Support Effects in Hydrodesulfurization Catalysts", Applied Catalysis, 25 (1986), pp. 273-293.

PCT International Preliminary Report on Patentability issued Feb. 26, 2013 in corresponding PCT Application No. PCT/US2011/025597, 5 pp.

\* cited by examiner

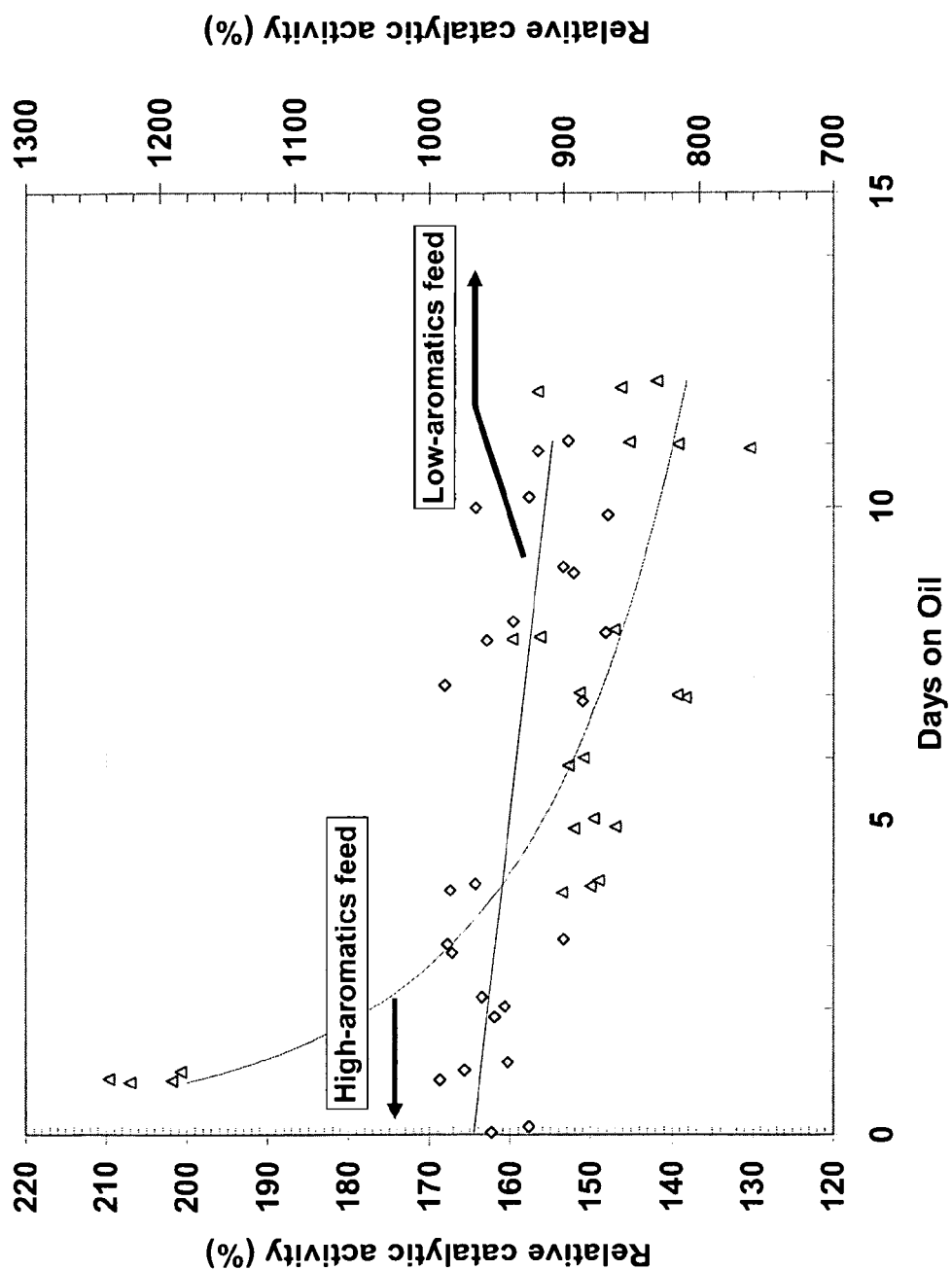

US 8,747,659 B2

HYDROTREATING PROCESS

FIELD OF THE INVENTION

This invention relates to a hydrotreating process for reducing the level of sulfur in diesel fuels and other aromatics- and sulfur-containing hydrocarbon feeds.

BACKGROUND OF THE INVENTION

Supported CoMo catalysts have been used for decades in the fixed bed hydrotreatment of diesel fuels. These catalysts have been proven to be very effective for removing the bulk of the sulfur content from diesel fuels at relatively low cost. Moreover, until the 2006 U.S. regulatory changes reduced the maximum sulfur levels in diesel fuels from 500 ppm by weight (S500) to 15 ppm by weight (S15), these catalysts were also typically very robust, generally lasting for years before replacements were necessary, and thereby typically affording very low catalyst cost.

However, delivering S15 generally requires an increase of the severity of the hydrotreating conditions when using the same catalyst, which in turn leads to faster catalyst deactivation, particularly in relatively low-pressure units that have to rely more on increased temperature to produce S15. The catalyst deactivation often accelerates so much that it significantly affects the cost of refining diesel fuel. There is, therefore, a need for process and/or catalyst solutions to mitigate the accelerated catalyst deactivation involved in hydrotreating diesel fuels to sulfur levels below 15 wppm.

According to the present invention, it has now been found that the impact of catalyst deactivation, particularly during the start up, can be reduced by using a start-up feed with reduced aromatic content as compared with that of the feed to be hydrotreated.

U.S. Pat. No. 3,436,338 discloses that hydrocracking catalysts which have been partially deactivated by polycyclic aromatic hydrocarbons present in the charge stock are reactivated by introducing a feed having a lower polycyclic aromatic content. This patent is, however, silent as to the effect of lowering the overall aromatic content of the deactivation rate of a fresh, undeactivated catalyst.

SUMMARY OF THE INVENTION

One aspect of the invention relates to a process for hydrotreating, or alternately starting up a hydrotreating process involving, a first aromatics- and sulfur-containing hydrocarbon feed, preferably a diesel fuel (for example having an aromatic content of at least 20 wt %), using a fresh supported CoMo catalyst, the process including, or consisting essentially of, treating the fresh catalyst under first hydrotreating conditions with a second hydrocarbon feed having a lower aromatics content than the first feed, and then, optionally but preferably, also hydrotreating the first feed. Advantageously, the first hydrotreating conditions can include a temperature of about 300° C. to about 350° C., a pressure of about 1.5 MPag to about 3.5 MPag, and an LHSV of about 0.3 hr$^{-1}$ to about 1.0 hr$^{-1}$. In one embodiment, the treating is conducted from 3 days to 10 days.

In one embodiment, the process further comprises contacting the treated catalyst with the first aromatics- and sulfur-containing hydrocarbon feed under second hydrotreating conditions to reduce the sulfur content of the first feed to 15 wppm or less. Conveniently, the second hydrotreating conditions include a temperature of about 300° C. to about 380° C., a pressure of about 1.5 MPag to about 3.5 MPag, and an LHSV of about 0.2 hr$^{-1}$ to about 0.8 hr$^{-1}$.

In one embodiment, the first and second hydrotreating conditions can be substantially the same.

Conveniently, the second feed can be produced by adding aliphatic hydrocarbons to the first feed. In one such embodiment, the process can further comprise adding the aliphatic hydrocarbons to the first feed so as to reduce the aromatics content thereof by at least 50%.

BRIEF DESCRIPTION OF THE DRAWINGS

FIG. 1 shows a comparison of the start-of-run (SOR) deactivation of the supported CoMo hydrotreating catalyst of Example 1 with two different feeds, one highly aromatic and one nearly free of aromatics, at otherwise identical conditions.

DETAILED DESCRIPTION

Described herein is a process for hydrotreating a first aromatics- and sulfur-containing hydrocarbon feed using a fresh supported CoMo catalyst, wherein the average rate of deactivation of the catalyst is reduced by treating the fresh catalyst under first hydrotreating conditions with a second hydrocarbon feed having a lower aromatics content than the first feed.

As used herein the term "fresh catalyst" is used to describe a catalyst which has not previously been used in a catalytic process or which has not previously contacted the first feed since a prior regeneration or reactivation. Fresh catalyst may, however, have undergone prior activity adjustment, for example, by sulfiding.

In addition, the term "supported catalyst" is used to describe a catalyst in which the active components, in this case cobalt and molybdenum metals or compounds thereof, are deposited on a carrier or support.

In particular, the present catalyst comprises cobalt, which can typically be present in an oxide form in an amount ranging from about 2 wt % to about 20 wt %, preferably from about 4 wt % to about 12 wt %, based on the total catalyst weight. Similarly, the catalyst also comprises molybdenum, which can typically be present also in an oxide form in an amount ranging from about 5 wt % to about 50 wt %, preferably from about 10 wt % to about 40 wt %, for example from about 20 wt % to about 30 wt %, based on the total catalyst weight. In most embodiments, the remainder of the catalyst can be composed of the support material, although optionally other components may be present (e.g., filler, cracking component, molecular sieve, or the like, or a combination thereof).

Suitable support materials for the present catalysts can include, but are not limited to, inorganic refractory materials such as alumina, silica, silicon carbide, amorphous and crystalline silica-aluminas, silica-magnesias, aluminophosphates, boria, titania, zirconia, and the like, as well as mixtures and cogels thereof. Preferred supports can include silica, alumina, alumina-silica, and the crystalline silica-aluminas, particularly those materials classified as clays or zeolitic materials. More preferred support materials for purposes of the present process can include alumina, silica, and alumina-silica, particularly either alumina or silica.

Supported CoMo catalysts of the type described above are available commercially from a number of vendors and/or can be produced by methods well known in the art, for example, such as described in R. G. Leliveld et al., *J. Catal.*, 175 (1998), 108-116, in M. S. Rana et al., *J. Catal.*, 246 (2007), 100-108, and in H. Topsoe and B. S. Clausen, *Appl. Catal.,* 25 (1986), 273-293, the entirety of each disclosure being incorporated herein by reference.

The catalytic metals may be loaded onto the support, e.g., by any conventional techniques, such as impregnation by incipient wetness, by adsorption from excess impregnating medium, by ion exchange, or the like, or combinations thereof. The typical impregnation route is by incipient wetness.

The cobalt and molybdenum components can be deposited onto the support material in either a single step or in two separate steps. For example, in a two-step process, a catalyst precursor can be prepared by impregnating a catalyst support with a first aqueous solution comprising a water soluble salt of cobalt or molybdenum in such concentration as to provide the resulting catalyst precursor with the desired amount of the metal. The impregnated support can then be dried, e.g., by conventional drying techniques (for example at a temperature of about 100° C.) until substantially all the water is driven off (for example, typically for about 2 to about 6 hours). The dried impregnated support can then be oxidized by heating from the drying temperature to about 250° C. to about 450° C. (for example, to about 275° C. to about 400° C.) in the presence of an oxidizing gas, such as air. At least a portion of the resulting partially formed catalyst precursor can then be impregnated a second time with a second aqueous solution containing an effective amount of a water soluble salt of cobalt or molybdenum (the remaining metal not impregnated during the first impregnation) in the appropriate concentration. The partially formed catalyst precursor, now containing both metal components, can then be subjected to second drying and oxidation operations. In an alternate, though less preferable, two-step embodiment, the impregnation steps can be done back to back, with only drying in between first and second aqueous treatments, with a single oxidization step to follow. In another alternate, though less preferable, two-step embodiment, the first and second aqueous solutions can both have water soluble salts of both cobalt and molybdenum, such that the metals are co-impregnated (like a single step embodiment) but in two separate, consecutive stages, with the drying and oxidization steps occurring as stated above.

The resultant catalyst precursor can be converted to the final catalyst by sulfiding, e.g., using conventional sulfiding techniques. This sulfiding may be accomplished in situ, namely in the hydrotreating reactor, by contacting the catalyst with a sulfur-containing feed, e.g., such as $H_2S$, dimethyldisulfide (DMDS), or polysulfides (e.g., as disclosed by C. D. Roberts in the September 2008 issue of Hydrocarbon Processing (p. 133)), or the like, or a combination thereof, in the presence of a flow of about 50 scf/bbl (about 8.5 $Nm^3/m^3$) to about 1500 scf/bbl (about 260 $Nm^3/m^3$) of hydrogen equivalent (in a gas containing less than 100% hydrogen, this should represent the relative or partial hydrogen treat gas rate) under conditions sufficient to effectuate hydrotreating, e.g., which can include a temperature of about 75° C. to about 450° C., a (total) pressure of about 10 psig (about 210 kPag) to about 2500 psig (about 17.3 MPag), and, in liquid-sulfiding processes utilizing DMDS or polysulfides, a liquid hourly space velocity (LHSV) of about 0.3 $hr^{-1}$ to about 2.0 $hr^{-1}$.

The resultant sulfided catalyst can be employed to hydrotreat a wide variety of aromatics- and sulfur-containing hydrocarbon feeds, including distillates and residual oils from atmospheric and vacuum distillation processes, cracked gas oil fractions, and mixtures thereof. In particular, the present process can advantageously be used to hydrotreat hydrocarbon fractions boiling in the diesel fuel range and having an aromatics content of at least 20 wt %, typically from 20 wt % to about 45 wt %, and having a sulfur content of at least about 0.8 wt %, typically from about 1.2 wt % to about 2.6 wt %.

However, before the catalyst is used to hydrotreat a desired (first hydrocarbon) feed, the present process involves treating the fresh catalyst under first hydrotreating conditions with a second hydrocarbon feed having an aromatics content lower than the desired (first hydrocarbon) feed (and/or having an aromatics content below 20 wt %). Conveniently, the first hydrotreating conditions can include a temperature from about 300° C. to about 350° C., a (total) pressure from about 1.5 MPag to about 3.5 MPag, and an LHSV from about 0.3 $hr^{-1}$ to about 1.0 $hr^{-1}$. Moreover, the treating can be conducted for about 3 days to about 10 days, or until the activity of the fresh catalyst has been reduced by at least 5%, for example from 5% to about 15% or from 5% to about 10%. Although the exact composition of the second feed used for the start-up treatment may not be critical, it should generally have an aromatics content below about 15 wt % (e.g., below about 10%, below about 5 wt %, or even below about 2 wt %), which could be produced, for example, by adding aliphatic hydrocarbons (linear, branched, and/or cyclic; perhaps having double bonds, maybe even conjugated double bonds, but not being aromatic) to the desired hydrotreating feed so as to reduce the aromatics content thereof to with the acceptable range (e.g., reduction by at least 50% from its previous level).

After treatment with the second, lower aromatics-content feed, typically in the hydrotreating reactor, the catalyst can be used to hydrotreat the desired hydrotreating feed under second hydrotreating conditions to reduce the sulfur content of the feed, e.g., to less than 15 wppm. In a preferred embodiment, the second hydrotreating conditions can include a temperature of about 300° C. to about 380° C., a (total) pressure of about 1.5 MPag to about 3.5 MPag, and an LHSV of about 0.2 $hr^{-1}$ to about 0.8 $hr^{-1}$. Also in a preferred embodiment, the first and second hydrotreating conditions can be substantially the same.

The invention will now be more particularly described with reference to the following Examples and the accompanying drawing.

EXAMPLES

The tests reported in the Examples are conducted in a hydrodesulfurization (HDS) reactor comprising three identical stainless steel cylindrical chambers, each having an internal diameter of about 0.28 inches (about 0.70 cm) and a length of about 7.0 inches (about 18 cm). Fritted gaskets or quartz wool was used to hold the catalyst in place within the reactor chamber. Isolation valves were included to enable off-line catalyst extraction under relatively inert conditions.

All three reactor chambers were placed into a common sand bath, the temperature of which was monitored by three thermocouples positioned to be level approximately with the top, middle, and bottom of the catalyst beds. Any of the three reactors were capable of being operated and capable of being removed from the sand bath independently of the other reactors. $H_2$, $N_2$, or approx. 10 vol % $H_2S/H_2$ was fed to the reactors using three independent Brooks Mass Flow Controllers. Three independent HPLC pumps (e.g., Thermo Separation Products ConstaMetric 3200 Solvent Delivery System) fed the sulfidation liquid to the reactors. Three independent ISCO pumps (e.g., Model 500D Syringe Pumps) fed the oil to the reactors during HDS runs.

The gas and liquid feeds were mixed together before arriving at the catalyst bed. The feed was preheated as it traveled down the feed leg before entering the reactor chamber from the bottom. The flow regime in all barrels was up-flow.

Effluent liquids and gases were sent to a slop can where liquids were collected. Gases were vented to a scrubber filled with aqueous KOH solution to neutralize $H_2S$. During sample collection, a knock-out pot separated gases from liquids, again venting gases to the scrubber.

Liquid effluent samples were analyzed using a sulfur/nitrogen analyzer (e.g., ANTEK 9000 Series). Data acquisition software (e.g., from National Instruments) was configured to operate the hardware and an Autosampler (e.g., ANTEK Model 738). The software collected an integrated area or peak height from the analysis of materials of known composition to create an internal calibration curve. The analytical response of sample unknowns was then compared to this calibration curve, and the amount of sulfur and/or nitrogen was determined. Calibration curves were generally approximately linear, and $1^{st}$ order correlation curve coefficients were obtained in cases where the total S or N concentration range was within an order of magnitude (e.g., 10-100 wppm) of the unknown.

The user was given the ability to define the S/N concentration range ("calibration range") that best approximated the expected range of concentrations in the samples. Typical ranges include 0-10 wppm, 10-100 wppm, 100-1000 wppm, and 1000-10,000 wppm. A calibration file was created for the user-defined range. Detector sensitivity was adjusted, as needed to maximize the peak height of the highest concentration standard in a range to fit within the viewing screen. Detector sensitivity was changed, as needed, by adjusting gain and/or voltage for each photomultiplier tube. The sulfur/nitrogen analyzer was then calibrated for detecting concentrations in this range by utilizing standard mixtures (e.g., from Petroleum Analyzer Company). The matrix was iso-octane, with dibenzothiophene or carbon disulfide as the sulfur source, and with pyridine as the nitrogen source. If the concentration of a sample fell outside the defined calibration ranges, the user had the ability to create a new file and to calibrate the sulfur/nitrogen analyzer for the new (amended) range.

Since nitrogen concentrations in the samples were frequently in a different range than sulfur concentrations, a calibration file was created that included a combination of calibration ranges for both S and N. A typical calibration file covered the range 10-100 wppm nitrogen and 100-1000 wppm sulfur, although other combinations may be used to reflect other actual conditions.

The user was given the ability to specify the specific gravities of the standards and samples. Typically, 0.69 g/mL was entered for the iso-octane-based standard, and about 0.85-0.88 g/mL was typically entered for diesel samples (depending on their actual density). The auto-sampler was programmed, for example, to make three 8-μL injections for each sample and to calculate the average. The average was reported and used for catalyst activity calculations.

Feedstock properties, along with temperatures, pressures, gas and liquid flow rates, and feed and effluent sulfur levels for each balance were used to calculate HDS activity. An "actual" catalyst activity for desulfurization ($K_{actual}$ or $K_a$) was calculated as a function of actual processing conditions, and was adjusted to base conditions for hydrogen partial pressure, treat gas rate, and temperature. A "predicted" catalyst activity ($K_{predicted}$ or $K_p$) was then calculated based on earlier-collected data with a reference catalyst to account for the feedstock properties at base conditions. A relative catalyst activity (RCA) was calculated from the ratio of $K_{actual}$ to $K_{predicted}$, as follows:

$$RCA = \frac{K_a}{K_p}$$

Example 1

About 5 grams of a commercial CoMo catalyst was loaded into each barrel of the HDS reactor. The catalyst bed volume in each barrel was approximately 6 mL. After leak testing, the catalysts were sulfided using a ~2.5 wt % hexadecane solution of DMDS (about 2.0 mL liquid/(mL catalyst h) LHSV) and hydrogen (about 500 standard mL $H_2$/(mL catalyst h) GHSV). The sulfidation lasted about 64 hours and involved an ~8 hour ramp from ambient temperature (about 20-25° C.) to 220° C., holding for about 16 hours at about 220° C., followed by a ~24 hour ramp to about 338° C. (about 640° F.), and holding for about 16 hours at 338° C.

The HDS activity was tested at nominal conditions of about 329° C., about 280 psig (about 1.9 MPag), an LHSV of about 0.54 $hr^{-1}$, a gas hourly space velocity (GHSV) of about 62 $hr^{-1}$, a treat gas ratio of about 645 scf/bbl (about 110 $Nm^3/m^3$). The treat gas was approximately 100% pure hydrogen, although less pure hydrogen with a relatively inert gas (e.g., nitrogen) could have been used to attain a similar result. In the reference run, a refinery diesel oil stream having the properties given in Table 1 was employed.

TABLE 1

| Feed Sulfur, wt % | ~1.85 |
|---|---|
| Feed Nitrogen, wppm | ~157.0 |
| Feed API Gravity | ~32.6 |
| Feed Specific Gravity | ~0.862 |
| Feed Bromine Number, centigrams/gram | ~1.45 |
| Distillation Type | GCD |
| Distillation, ° F. | |
| IBP | ~335 |
| 10 wt % | ~553 |
| 30 wt % | ~627 |
| 50 wt % | ~661 |
| 70 wt % | ~690 |
| 90 wt % | ~722 |
| 95 wt % | ~736 |
| Saturates, wt % | ~67.8 |
| Aromatics, wt % | ~32.2 |
| mono-aromatics, wt % | ~20.9 |
| di-aromatics, wt % | ~9.8 |

In another experiment, a relatively low aromatics feed (cut with hexadecane) containing about 1.8 wt % total sulfur content with a thiophene/dibenzothiophene molar ratio of about 8:1, was employed in place of the diesel oil of Table 1. The start of run (SOR) deactivation of the supported CoMo catalyst was measured with both feeds at identical conditions during the first 12 days on oil (days on stream). The results are summarized in FIG. 1.

FIG. 1 shows a comparison of start-of-run (SOR) deactivation of the supported CoMo hydrotreating catalyst with the two different feeds at otherwise identical conditions. As shown in FIG. 1, the deactivation after 12 days on stream was reduced from about 33% of the initial activity with the refinery diesel oil stream (containing about 32 wt % aromatics and about 1.8 wt % total sulfur) to about 6% of the initial activity with the hexadecane-based relatively low aromatics feed (containing about 1.8 wt % total sulfur). This demonstrates that the rate of deactivation of the same catalyst was substantially reduced when a relatively low aromatics feed was used at the start of run, in stead of a relatively higher aromatics feed.

Without being bound by theory, it is believed that the relative catalytic activity (RCA) with the relatively low aromatics feed was higher due to the absence of inhibitors, e.g., nitrogen-containing compounds. While nitrogen-containing compounds can inhibit catalytic activity, which can result in lower observed catalytic activity at higher contents of nitrogen-containing compounds (nitrogen contents), they are not believed to significantly affect the rate of deactivation. The effect of nitrogen-containing compounds on the catalytic activity and rate of deactivation of the supported CoMo catalyst was also examined for feeds with about the same aromatics content and total nitrogen concentrations of (a) about 2 wppm, (b) about 12 wppm, and (c) about 157 wppm (nitrogen compounds were selectively extracted to different levels from a diesel feed). While the level of nitrogen-containing compounds can impact the level of catalytic activity at the same conditions, it did not seem to significantly affect the rate of deactivation. In the process of these experiments, seemingly independent of the total nitrogen content of the feeds to the hydrotreating unit, all deactivation curves appeared approximately linear, indicating roughly first order deactivation kinetics, with approximately identical slopes, indicating a significantly similar deactivation rate. The total nitrogen content, however, did seem to affect the observed catalytic activity (RCA) values.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for hydrotreating a first aromatics- and sulfur-containing hydrocarbon feed boiling in the diesel fuel range using a fresh supported CoMo catalyst, the process comprising:

treating a fresh, sulfided CoMo hydrotreating catalyst having a support of amorphous alumina, silica or alumina-silica, under first hydrotreating conditions including a temperature of about 300° C. to about 350° C., a pressure of about 1.5 MPaq to about 3.5 MPaq, and an LHSV of about 0.3 $hr^{-1}$ to about 1.0 $hr^{-1}$ with a second hydrocarbon feed having a lower aromatics content than said first feed, the second hydrocarbon feed having an aromatics content of less than 20 wt % to reduce the activity of the catalyst by at least 5% and, following the treatment with the second hydrocarbon feed, hydrotreating the first feed using the treated catalyst under hydrotreating conditions including a temperature of about 300° C. to about 380° C., a pressure of about 1.5 MPag to about 3.5 MPaq, and an LHSV of about 0.2 $hr^{-1}$ to about 0.8 $hr^{-1}$ to reduce the sulfur content of said first feed to 15 wppm or less.

2. The process of claim 1, wherein said treating with the second hydrocarbon feed is conducted from 3 days to 10 days.

3. The process of claim 1, wherein said first and second hydrotreating conditions are substantially the same.

4. The process of claim 1, wherein the first feed has an aromatics content of at least 20 wt %.

5. The process of claim 1, wherein the second feed is produced by adding aliphatic hydrocarbons to the first feed.

6. The process of claim 5, further comprising adding said aliphatic Hydrocarbons to the first feed so as to reduce an aromatics content thereof by at least 50%.

* * * * *